Nov. 1, 1960 F. F. SNELL 2,958,758
GEAR AND SHAFT ASSEMBLY
Filed Oct. 4, 1957
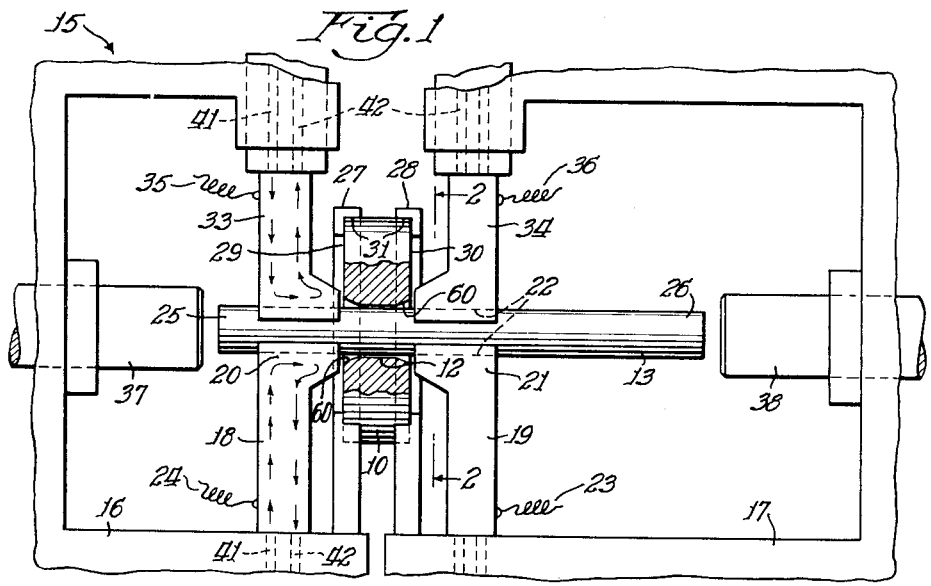
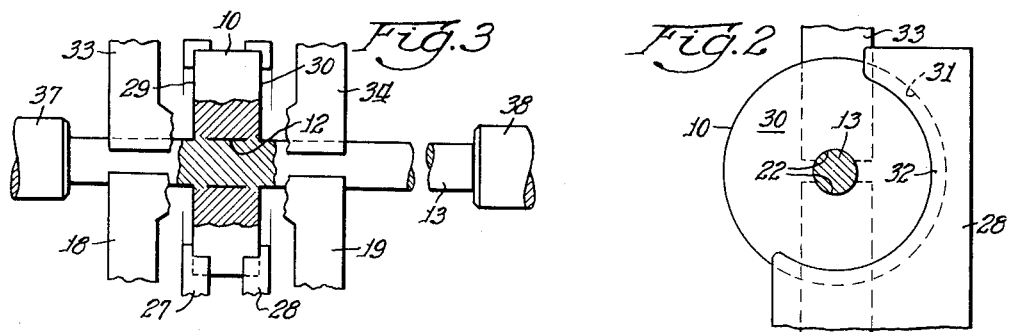
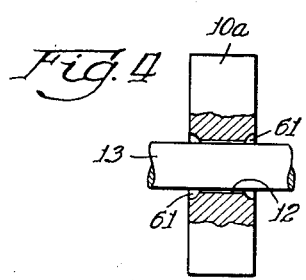
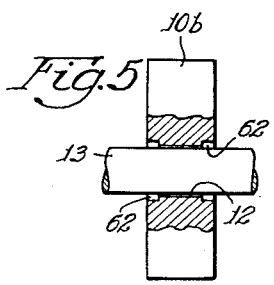
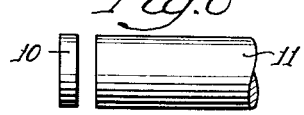
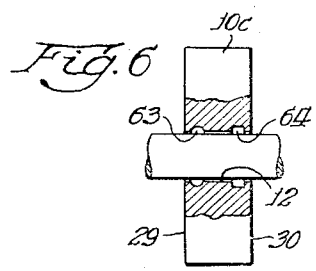
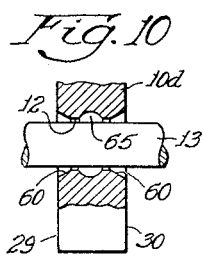
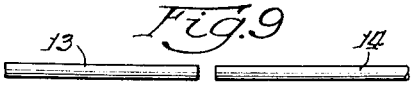
Inventor:
Ford F. Snell
By: Frank C. Parker Atty.

United States Patent Office 2,958,758
Patented Nov. 1, 1960

2,958,758
GEAR AND SHAFT ASSEMBLY

Ford F. Snell, Big Prairie, Ohio, assignor to Borg-Warner Corporation, Chicago, Ill., a corporation of Illinois Filed Oct. 4, 1957, Ser. No. 688,205

20 Claims. (Cl. 219—152)

This invention relates to an improved gear and shaft assembly and to the method of fabricating a gear and shaft blank assembly in which the gear and shaft blanks are integrally interconnected.

Heretofore, when fabricating gear and shaft assemblies for use in high pressure gear pumps generally of the type disclosed in the patent to Roth et al., 2,420,622, which require gear and shaft structures in which there is no relative movement between the gear and shaft, it was necessary to machine from metal bar stock the complete gear and shaft structure, starting the machine operation with the bar stock having a diameter at least as large as the diameter of the desired gear size. As the axial length of the gear with respect to the axial length of the shaft is relatively small, much of the bar stock was cut away, resulting in a great amount of scrap metal. In view of the uneconomical waste of metal produced by the unitary gear and shaft assembly constructed from solid bar stock of the previously described method of fabrication and the high cost of labor involved in the machine operation therefor, many attempts have been made to separately form the gear and shaft and then unite the gear to the shaft. Such methods of uniting the gear to the shaft were accomplished through keying or interference fitting configurations. These methods proved satisfactory experimentally, but were costly and functionally not dependable in production. Other attempts were made to forge the gear and shaft assemblies, but resulted in additional stock removal difficulties and did not result in any appreciable cost reduction.

It is the principal object of this invention to provide a method of fabricating a gear and shaft blank assembly with a minimum of waste of scrap metal and with a consequent low cost.

It is another object of this invention to provide a method of fabricating a gear and shaft blank assembly in which a gear blank is united to a shaft blank, the resulting assembly having the qualities of a solid gear and shaft construction.

A further object of this invention is to provide a method of fabricating a gear and shaft blank assembly in which gear blanks are cut from appropriately sized round metal bar stock and telescopically mounted on shaft blanks cut from appropriately sized round metal bar stock and united thereto to form gear and shaft assemblies, which after suitable machining are suitable for use in high pressure gear pumps.

It is still another object of this invention to provide a method of fabricating a gear and shaft blank assembly suitable for use in high pressure gear pumps comprising the steps of: cutting a gear blank and a shaft blank from appropriately sized bar stock; forming a bore in the gear blank, the bore passing axially through the opposite sides of the gear blank and defining an internal peripheral surface of the gear blank; forming recesses in the internal peripheral surface of the gear blank; inserting the shaft blank in the bore of the gear blank so that the shaft blank projects beyond the opposite sides of the gear blank; placing electrical conductors around the shaft blank, in both physical and electrical contact therewith, and adjacent to the opposite sides of the gear blank but spaced therefrom; passing an electrical current through the electrical conductors to heat the shaft blank by resistance heating until the shaft blank becomes relatively plastic in the regions adjacent to and concentric with the opposite sides of the gear blank; and compressing axially the shaft blank to cause the relatively plastic regions of the shaft blank to expand radially and fill the recesses of the gear blank and fuse therewith, whereby the radially expanded regions of the shaft blank are confined within the recesses of the gear blank.

It is another object of my invention to provide an improved gear and shaft blank assembly which after suitable machining operations is suitable for use in high pressure gear-type pumps.

In the heretofore mentioned forging method of forming a gear and shaft blank assembly, not only was a cost reduction being sought but also an assembly in which the quality of the metal was improved by rendering greater density of the metal. In one type of the many types of forging methods, a solid gear blank has separate shaft pieces butt-welded to the opposed sides thereof. During the forging of the shaft pieces to the gear blank, the shaft metal is rendered more dense, which greatly improves its strength. However, additional stock removal operations, resulting from the forging operation, are necessary which are costly and thereby result in a gear and shaft blank assembly which is not appreciably different in cost than the previously described solid construction. In my present invention not only is a cost reduction realized, but also the shaft blank is greatly improved in strength because the axial compression thereof during the fusion of the shaft blank to the gear blank causes the metal to become more dense, similar to the strengthening of the shaft provided by the previously described forging methods. It is therefore still another object of my invention to provide a gear and shaft blank assembly at relatively low cost and improved in strength and quality.

Other and more particular objects, advantages and uses of my invention will become apparent from a reading of the following specification taken in connection with the accompanying drawing, forming a part thereof and wherein:

Figure 1 is an axial plan view of an assembled gear blank, shown in cross section, and shaft blank prior to the uniting operation of one embodiment of my invention.

Figure 2 is a portion of the end view of the gear blank and shaft blank assembly taken on the plane of line 2—2 of Figure 1 illustrating the gear blank holding means.

Figure 3 is a fragmentary view showing the principal features of Figure 1 after the uniting operation.

Figure 4 is an axial cross section of a gear blank assembled on a shaft blank according to another embodiment of my invention.

Figure 5 is an axial cross section of an assembled gear blank and shaft blank according to another embodiment of my invention.

Figure 6 illustrates still another embodiment of my invention where a gear blank is assembled on a shaft blank.

Figure 7 is a perspective view of the gear and shaft assembly used in high pressure gear-type pumps.

Figure 8 illustrates the method of cutting gear blanks from bar stock.

Figure 9 illustrates the method of cutting shaft blanks from bar stock.

Figure 10 is an axial cross section of an assembled gear blank and shaft blank according to another embodiment of my invention.

Reference is made to the accompanying drawing in which like reference numerals are used throughout to designate like parts and in particular to Figure 1 thereof, illustrating the preferred method of fabricating gear and shaft blank assemblies according to my invention to produce an end product as illustrated in Figure 7 where a gear blank or portion 10 has been united to a shaft blank or portion 13.

In the method of fabricating gear and shaft blank assemblies according to my invention gear blanks or portions 10 are cut to the desired axial length from appropriately sized round metal bar stock 11 (see Figure 8) by any well known machine operation. Shaft blanks or portions 13 are also cut to the desired axial length from appropriately sized round metal bar stock 14 (see Figure 9) in the same manner as the aforementioned gear blanks. It is to be understood that not only the axial length of the gear and shaft blanks, but also the cross sectional diameters thereof may be of such a size to allow for finishing operations of machining, polishing, etc., to be performed after the uniting operation hereinafter described which constitutes my main invention.

The gear blanks 10 are each provided with a central axial bore 12 by any well known boring or drilling operation, the bore passing through opposite sides 29 and 30 of the gear blank 10 and defining an internal peripheral surface of the gear blank 10. The bore 12 in the gear blank 10 has a size governed by the outer peripheral circumference of the shaft blank 13 on which the gear blank 10 is to be interconnected and made integral. A slight clearance space may be provided between the outer circumference of the shaft blank 13 and the bore 12 of the gear blank 10 of the order of .001 to .002 inch, although this accuracy need not be rigidly maintained so long as the shaft blank 13 may be inserted within the bore 12 of the gear blank 10.

The internal peripheral edges of the gear blank 10, defined by the juncture of the internal peripheral surface of the gear blank 10 and the opposite sides 29 and 30 of the gear blank 10 are recessed or cut away to provide an additional clearance space at the opposite sides 29 and 30 with respect to the shaft blank 13 when the shaft blank 13 is inserted within the bore 12 of the gear blank 10. As is illustrated in Figure 1, the internal peripheral edges of the bore 12 of the gear blank 10 have been beveled or chamfered by any well known reaming or chamfering operation to form beveled edges 60. The beveled edge 60 may be formed with any angle with respect to the inner peripheral surface of the gear blank 10 and may extend around the entire circumferential periphery of the bore 12 or for only portions thereof. I have illustrated the beveled edges 60 as extending around the entire circumferential periphery of the bore 12 at each end 29 and 30 of the gear blank 10 but do not intend to limit the scope of my invention thereby to that particular configuration. Further, the axial distance that the beveled edges 60 extend within the bore 12 of the gear blank 10 may be of any distance so long as beveled edges 60 define a frusto-conical surface. The beveled edge 60 at the side 29 of the gear blank need not be symmetrical with the beveled edge 60 at the side 30 of the gear blank 10.

Also, the peripheral edges of the bore 12 of the gear blank 10 may have some other configuration than that illustrated in Figure 1. For example, the gear blank 10a may be provided with grooves 61 at the peripheral edges of the bore 12 as shown in Figure 4. Here again, although Figure 4 illustrates that the grooves 61 at the internal peripheral edges of the gear blank 10a are arcuate in cross section, it is to be understood that the grooves may have any other cross sectional configuration than is shown in Figures 1 and 5.

The gear blank 10b, illustrated in Figure 5, has been recessed at the peripheral edge of the bore 12 with substantially right angled notches 62 which may be rectangular or square in cross section, and discloses another embodiment of my invention.

Another embodiment illustrating recesses formed in the internal peripheral surface of the gear blank 10, according to my invention, is illustrated in Figure 6 where the peripheral edges of the bore 12 of the gear blank 10c are not machined to provide grooves or notches. The groove 63 or notch 64 may be adjacent to the sides 29 and 30 respectively but spaced from the peripheral edge defined by the juncture of the internal peripheral surface of the gear blank 10c with the opposite sides 29 and 30 of the gear blank 10c.

There does not have to be any symmetry to the recess provided in the internal peripheral surface at the side 30 of the gear blank 10 with respect to the recess provided in the internal peripheral surface at the side 29 of the gear blank 10 as each gear blank 10 could have any combination of recesses as heretofore described and still come within the scope of my invention.

To maintain the gear blank 10 in its position on the shaft blank 13 during the uniting operation of my invention, any suitable holding device may be used. By way of illustration only, I have shown one such means in Figure 1 where a holding apparatus, generally indicated by reference numeral 15, comprises two flat horizontal metal plates 16 and 17 suitably secured to the base (not shown) of the apparatus 15 and adapted to be axially movable relative to each other for purposes of positioning to be later described.

Two hollow metal electrodes 18 and 19, fixedly attached and insulated therefrom, are carried by the respective plates 16 and 17 and have enlarged end portions 20 and 21 respectively providing arcuate bearing and contact surfaces 22 in the free ends thereof, the surfaces 22 having a configuration complementary to a portion of the outer peripheral surface of the shaft blank 13. The metal electrodes or conductors 18 and 19 are connected to a suitable electrical power source by any well known electric circuit means such as wires 23 and 24, shown schematically, and are adapted to have a cooling medium circulated therethrough by means of inlet 41 and outlet 42 passages connected at one end thereof to the hollow conductors 18 and 19 and to a cooling medium circulating source (not shown) at the other end thereof for the purpose of cooling the bearing surfaces 22 thereof as well as the rest of the structure of the conductors 18 and 19. Such electrical conductor or electrode coolant circulating means are well known in the art and need not be further described.

After the gear blank 10 has been provided with the proper axial bore 12, the gear blank 10 is mounted on the shaft blank 13. The shaft blank 13 with the gear blank 10 disposed therearound is then placed in the bearing surfaces 22 of the electrical conductors 18 and 19, the gear blank 10 being positioned between the conductors 18 and 19. Suitable aligning means may be provided to maintain the desired uniting position of the gear blank 10 relative to the terminal ends 25 and 26 of the shaft blank 13. One such means is illustrated in Figure 1 and more particularly in Figure 2 of the accompanying drawing and comprises two axially adjustable vertically mounted members 27 and 28, respectively connected to the plates 16 and 17 and having arcuate bearing portions 31 formed in the free ends thereof, adapted to complementarily receive and retain the gear blank 10. The arcuate bearing portions 31 do not extend axially through both sides of the members 27 and 28 but extend only on one side thereof providing shoulders or flange portions 32, the flanges 32 being adapted to retain the gear blank 10 disposed therebetween. As the members 27 and 28 are axially movable, they are maintained in their extended position, i.e., the position where the space between members 27 and 28 is greatest, when the shaft blank and gear blank assembly is placed in the bearing or holding surface 22 of the conductors 18 and 19, the space between members 27 and 28 being large enough to permit the gear blank 10 to be disposed therebetween. After the shaft blank and gear blank are so positioned, the members 27 and 28 are axially moved toward each other until the gear blank 10 is rigidly held between the shoulders 32 of the members 27 and 28 and has a portion of the outer peripheral edge thereof engaging the bearing surfaces 31 of the members 27 and 28.

The electrical conductors 18 and 19 are axially adjusted so that the enlarged portions 20 and 21 respectively thereof are positioned adjacent to and slightly spaced from the opposite sides 29 and 30 of the gear blank 10 when the gear blank and shaft blank assembly is positioned within the bearing surfaces 22 of the conductors 18 and 19.

When the gear blank 10 has been fastened by the members 27 and 28, vertically and axially adjustable electrodes or electrical conductors 33 and 34 are lowered vertically by pneumatic means (not shown) to clamp the shaft blank 13 between the mating bearing surfaces 22 of the conductors 33, 18 and 34, 19. The clamping force may be of the order of 25,000 pounds. The conductors 33 and 34 are similar to conductors 18 and 19, and have enlarged portions 20 thereon with bearing or contact surfaces 22 formed therein in the same manner as conductors 19 and 19, the conductors 33 and 34 being connected to the apparatus 15 in such a manner as to always be disposed vertically through axial adjustment above the conductors 18 and 19 respectively with the bearing surface 22 of conductor 33 adapted to mate with the bearing surface 22 of conductor 18, and the bearing surface 22 of conductor 34 adapted to mate with the bearing surface 22 of conductor 19.

As has been previously described, the electrical conductors 18 and 19 are connected to a suitable electrical power source (not shown) and are adapted to have a cooling medium circulated therethrough. Similar means are provided for the conductors 33 and 34, the electrical power source respectively comprising wires 35 and 36 and the cooling circulating means respectively comprising inlets 41 and outlets 42 passages in a manner common in the art.

It is now seen that the gear blank 10 is held rigidly with respect to any relative axial movement on the shaft blank 13 and that the shaft blank 13 is held rigidly within the mating bearing surfaces 22 of the electrical conductors 18 and 33, 19 and 34. As previously stated, the particular holding means of the shaft blank and gear blank assembly prior to the uniting operation does not constitute any part of this invention so long as the gear blank 10 is positioned and held in the desired axial alignment with respect to the shaft blank 13.

It should be noted that the electrical conductors 18 and 33 are adjacent to but spaced from the side 29 of the gear blank 10 and similarly electrical conductors 19 and 34 are adjacent to but spaced from the side 30 of the gear blank 10, and further that the conductors 18, 19, 33 and 34 are in good electrical contact with the shaft blank 13 due to the high clamping pressure previously described.

When the gear blank and shaft blank assembly are so mounted, an electrical current is passed to the electrical conductors 18, 19, 33 and 34 from the power source in such a manner that the current passes through the shaft blank 10 in the region thereof between the two pairs 18, 33 and 19, 34 of electrical conductors. Due to the electrical resistance of the shaft blank 13 and the high amperage of the current, intense heating of the shaft blank 13 takes place in the regions thereof adjacent the opposite sides 29 and 30 of the gear blank 10. This method of electrical heating per se is well known in the art as "resistance heating" and the theory thereof need not be presented herein except to say that by the resistance heating of the shaft blank 13 in the regions adjacent to the opposite sides 29 and 30 of the gear blank 10 is sufficient to cause those regions of the shaft blank 13 to become relatively plastic or molten in a relatively short period of time.

Since a cooling medium is circulating within the electrical conductors 18, 19, 33 and 34 near the bearing surfaces 22 thereof, as previously described, the shaft blank 13 is cooled in the portions thereof remote from the concentric portion disposed within the gear blank 10 and remains in the solid state. It should be understood that separate water cooling jackets common in the art may be placed about the exposed ends of the shaft blank 13 for the purpose of cooling instead of circulating coolant through the electrical conductors 18, 19, 33 and 34 as heretofore described.

When the regions of the shaft blank 13 adjacent the opposite sides 29 and 30 of the gear blank 10 have become relatively plastic, the electrical circuit for the electric conductors 18, 19, 33 and 34 is maintained and pneumatically operated ram or impacting members 37 and 38 carried by the apparatus 15 and mounted coaxially and spaced from the shaft blank 13, engage the ends 25 and 26 of the shaft blank 13 and compress the shaft blank 13 axially to effect radial expansion of the relatively plastic regions of the shaft blank 13 to expand radially and fill the clearance space between the shaft blank 13 and the beveled edges 60 of the gear blank 10 and fuse with the gear blank 10. Very little or no metal from the relatively plastic regions of the shaft blank 13 is forced beyond the opposite sides 29 and 30 of the gear blank 10, the entire radial expansion thereof filling the clearance space between the beveled edges 60 of the gear blank 10 and the shaft blank 13, thereby uniting same together.

After the gear blank 10 has been fused to the shaft blank 13, the electrical current supplied to the electrical conductors 18, 19, 33, and 34 is broken. It is believed that during the axial compression of the shaft blank 13 by the rams 37 and 38 the radially expanding relatively plastic regions of the shaft blank 13 make electrical contact with the gear blank 10 causing the electrical current passing through the shaft blank 13 to be shunted through the gear blank 10. The shunting of the electrical current through the gear blank 10 is believed to cause heating of the gear blank 10 and to assist in the fusion of the gear blank 10 to the relatively plastic regions of the shaft blank 13. The electrical current is broken at an appropriate time interval after the axial compression of the shaft blank 13 by suitable time switching means to provide for suitable fusion of the shaft blank 13 to the gear blank 10.

Figure 3 illustrates the impacting or compression operation of rams 37 and 38 upon the gear and shaft blank assembly above described for Figure 1. It should be noted that the fusing of the shaft blank 13 to the gear blank 10 will probably not extend throughout the entire length of the axial bore 12 of the gear blank 10, but only from the opposite sides 29 and 30, the beveled edges 60 of the gear blank 10, and for a short distance within the bore 12. It is believed that the reason why the fusing of the shaft blank 13 to the gear blank 10 does not extend throughout the entire axial bore 12 of the gear blank 10 is because the gear blank 10 acts as a chill block absorbing the heat generated and radiated in the shaft blank 13 at the portion thereof located between the adjacent sides 29 and 30 of the gear blank 10 during the electrical heating thereof. This limits the regions of the shaft blank 13 which can become relatively plastic to those regions adjacent the opposite sides 29 and 30 of the gear blank 10.

It is believed that the axial compression of the shaft blank 13 by the rams 37 and 38 not only causes fusion of the relatively plastic regions of the shaft blank 13 to the gear blank 10, but also places the gear blank under internal peripheral tension as the relatively plastic regions of the shaft blank 13 are expanded radially within the bore 12 of the gear blank 10. However, during subsequent heat treating operations of the gear and shaft blank assembly, much of the pre-stressing of the inner periphery of the gear blank is lost.

It is also believed that since the shaft blank 13, during the heating operation thereof, expands axially according to a well known law of nature and the relatively plastic regions of the shaft blank 13, when expanded radially by the axial compression of the shaft blank 13, fill the clearance space between the gear blank 10 and the shaft blank 13 at each end of the gear blank 10, the shaft blank is placed under axial tension by the wedging action of the shaft blank 13 with the beveled edges 60 of the gear blank 10 as the shaft blank 13 tends to contract upon the cooling thereof providing a more rigid union between the shaft blank 13 and the gear blank 10. As above mentioned, much of the wedging action of the shaft blank is lost during subsequent heat treating operations of the gear and shaft blank assembly.

Whereas only the axial tensioning of the shaft blank 13 with respect to a gear blank 10, having beveled edges 60, has been described above, substantially the same results are produced with any of the gear blanks heretofore described and illustrated that are provided with various types of recesses at the opposite ends of the bore 12 to create a clearance space between the gear blank 10 and shaft blank 13.

In the apparatus 15 heretofore described it was illustrated that a ram member engaged both terminal ends 25 and 26 of the shaft blank 13 for the axial compression thereof. It should be understood that this described arrangement was for purposes of illustration only whereas only one end 25 or 26 could be subject to a compression stroke of an impacting member with the other end of the shaft blank 13 being in contact with a fixed abutting plate. Further, the uniting operation of the gear and shaft assembly is illustrated as occurring in the horizontal position whereas same could be accomplished in accordance with this invention while being held in the vertical position.

I have described the heating of the shaft blank 13 as occurring through electrical "resistance" heating. However, any other type of heating process may be used either electrical or otherwise so long as the portions of the shaft blank 13 adjacent to the opposite sides 29 and 30 of the gear blank 10 will become relatively plastic for the fusing thereof to the gear blank 10 during the axial compression of the shaft blank.

Another embodiment of this invention, as shown in Figure 10, comprises forming an annular groove 65 within the bore 12 of the gear blank 10d intermediate the opposed sides 29 and 30 thereof and intermediate the recesses or beveled edges 60. The annular peripheral groove 65 within the center of the bore 12 of the gear blank 10d is believed to be utilized to control the heretofore described shunting of the electrical current from the shaft blank 13 through the gear blank 10d. Although the annular groove 65 is shown having a semi-circular cross section, the groove 65 may have any cross sectional configuration by properly forming the groove 65 within the bore 12 of the gear blank 10d which provides an additional clearance space between the gear blank 10d and the shaft blank 13. In this manner when the shaft blank 13 is compressed axially, the relatively plastic regions thereof are expanded radially and make contact with the beveled edges 60 of the gear blank 10d at only the recessed areas of the gear blank 10d. Therefore, the fusion of the relatively plastic regions to the gear blank 10d occurs only in the recessed regions of the gear blank 10d as the groove 65 provides a greater clearance space than does the recesses adjacent the opposite sides 29 and 30 of the gear blank 10d. It should be understood that the annular groove 65 need not be formed only in the bore 12 of the gear blank 10d but may be formed in the outer periphery of the shaft blank 13 or in both the gear blank bore 12 and the shaft blank 13, the purpose being to provide a clearance space between the telescoped portion of the shaft blank 13 and the gear blank 10d whereby the radially expanded relatively plastic regions of the shaft blank 13 can only make contact with the recessed edges of the gear blank 10d on either side of the clearance space provided by the annular groove 65 adjacent the opposite sides 29 and 30 of the gear blank 10d.

It is to be understood that although the gear blank 10 has been described as being formed with a central bore 12, it is not the intent to limit the invention to this particular arrangement. The bore 12 could be formed eccentrically through the gear blank 10 and the shaft blank 13 inserted therein and fused thereto in the manner previously described. Further, the bore 12 in the gear blank 10 need not be circular in cross section but may have any cross sectional configuration, and the shaft blank 13 may also have any cross sectional configuration. The cross sectional configuration of the shaft blank 13 or inserted member does not necessarily need to complement the cross sectional configuration of the bore in the outer member to which it is fused by the heretofore described method so long as the axial compression of the inserted member is sufficient to expand relatively plastic portions of the inserted member so as to make contact with portions of the bore in the outer member and fuse therewith. Of course, the preferred form of this invention is to have the inserted member complement the cross sectional configuration of the bore in the outer member so that fusion thereto takes place throughout the entire cross section of the inserted member but is not limited to this form.

After the impacting operation of the uniting means of this invention, the gear blank 10 and the shaft blank 13 are rendered substantially integral with each other and after finishing operations are suitable for use in high pressure gear pumps, there being no relative movement between the gear blank 10 and the shaft blank 13. This construction has substantially all the advantages of a solid gear and shaft assembly at a considerable saving in manufacturing costs heretofore described.

The above brief description setting forth the fabrication steps of my invention to produce unitary gear and shaft blank assemblies from two separate pieces is by way of example only, whereas various steps, where appropriate, could be interchanged to facilitate production procedures without changing the scope of my invention which may be summarized as follows: Cutting a gear blank 10 from the appropriately sized bar stock 11; forming a bore 12 in the gear blank 10, said bore 12 passing axially through the opposite sides 29 and 30 of the gear blank 10 and defining an internal peripheral surface of the gear blank 10; forming recesses 60, 61, 62, 63 or 64 in the internal peripheral surface of the gear blank 10; cutting a gear blank 10 from the appropriately sized bar stock 14; inserting the shaft blank 13 within the bore 12 of the gear blank 10, so that the ends 25 and 26 of the shaft blank 13 project beyond the opposite sides 29 and 30 of the gear blank 10; placing electrical conductors 18, 19, 33 and 34 around the shaft blank 13, in contact therewith, and spaced from the opposite sides 29 and 30 of the gear blank 10; placing coolant circulating means around the shaft blank 13; passing an electrical current through the electrical conductors 18, 19, 33 and 34 to heat the shaft blank 13 by resistance heating until the shaft blank 13 becomes relatively plastic in the regions adjacent to the opposite sides 29 and 30 of the gear blank 10 and concentric therewith; and compressing axially the shaft blank 13 by means of rams or press members 37 and 38 to cause the relatively plastic regions of the shaft blank 13 to expand radially and fill the recesses 60, 61, 62, 63 or 64 of the gear blank 10 and fuse thereto, whereby the radially expanded regions of the shaft blank 13 are confined within the recesses 60, 61, 62, 63 or 64 of the gear blank 10.

After the gear blank 10 and the shaft blank 13 have been united as above described, further finishing operations may be accomplished, such as providing gear teeth 40 (see Figure 7) on the outer peripheral surface of the gear blank 10 as well as on the shaft blank 13 if desired.

My invention has solved the problem of fabricating a gear and shaft blank assembly having a unitary quality from a two-piece construction at a considerable reduction in cost and with relatively no waste metal, the heating and impacting operations of the uniting means taking less than ten seconds in practice.

I have further provided an improved gear and shaft assembly where a shaft portion projects beyond the opposite sides of a gear portion telescopically mounted thereon, the shaft portion having been united to the gear portion in such a manner that the gear and shaft assembly has substantially the qualities of a unitary construction.

While I have described my invention in connection with certain specific embodiments thereof, it is to be understood that these are by way of example rather than limitation, and it is intended that the invention be defined by the appended claims which are to be given a scope as broad as consistent with the prior art.

I claim:

1. The method of uniting two metal blanks to be telescopically disposed with respect to each other and comprising the steps of: forming a bore in the first blank of said blanks, said bore passing axially through opposite sides of said first blank and defining an internal peripheral surface of said first blank; forming recesses in said internal peripheral surface of said first blank; inserting the second blank of said blanks in said bore; heating said second blank in the regions thereof adjacent to and between said opposite sides of said first blank until said second blank becomes relatively plastic in said regions of said second blank; and compressing said second blank axially to effect radial expansion of said relatively plastic regions and thereby cause said relatively plastic regions to fill said recesses of said first blank and fuse therewith, whereby the radially expanded regions of said second blank are confined within said recesses of said first blank.

2. The method of uniting two metal blanks to be telescopically disposed with respect to each other in accordance with the method of claim 1 where said recesses in said internal peripheral surface of said first blank are formed by beveling the junctures of said opposite sides of said first blank and said internal peripheral surface.

3. The method of uniting two metal blanks to be telescopically disposed with respect to each other in accordance with the method of claim 1 where said recesses in said internal peripheral surface of said first blank are formed by grooving the junctures of said internal peripheral surface and said opposite sides of said first blank.

4. The method of uniting two metal blanks to be telescopically disposed with respect to each other in accordance with the method of claim 1 where said recesses in said internal peripheral surface of said first blank are formed by notching the junctures of said internal peripheral surface and said opposite sides of said first blank, said notched recesses having a substantially right-angled cross sectional configuration.

5. The method of uniting two metal blanks to be telescopically disposed with respect to each other in accordance with the method of claim 1 where said recesses in said internal peripheral surface of said first blank are located adjacent to but spaced from said opposite sides of said first blank.

6. The method of uniting two metal blanks to be telescopically disposed with respect to each other and comprising the steps of: forming a bore in the first blank of said blanks, said bore passing axially through opposite sides of said first blank and defining an internal peripheral surface of said first blank; forming recesses in said internal peripheral surface of said first blank adjacent said opposite sides of said gear blank; forming a groove in said bore; inserting the second blank of said blanks in said bore; heating said second blank in the regions thereof adjacent to and between said opposite sides of said first blank until said second blank becomes relatively plastic in said regions of said second blank; and compressing said second blank axially to effect radial expansion of said relatively plastic regions and thereby cause said relatively plastic regions to fill said recesses of said first blank and fuse therewith, whereby the radially expanded regions of said second blank are confined within said recesses of said first blank.

7. The method of uniting two metal blanks to be telescopically disposed with respect to each other and comprising the steps of: forming a bore in the first blank of said blanks, said bore passing axially through opposite sides of said first blank and defining an internal peripheral surface of said first blank; forming recesses in said internal peripheral surface of said first blank; inserting the second blank of said blanks in said bore so that said second blank projects beyond said opposite sides of said first blank; heating said second blank in the regions thereof adjacent to and between said opposite sides of said first blank until said second blank becomes relatively plastic in said regions of said second blank; and compressing said second blank axially to effect radial expansion of said relatively plastic regions and thereby cause said relatively plastic regions to fill said recesses of said first blank and fuse therewith, whereby the radially expanded regions of said second blank are confined within said recesses of said first blank.

8. The method of making a gear and shaft blank assembly where said gear blank and said shaft blank are to be united and comprising the steps of: forming a bore in said gear blank, said bore passing axially through opposite sides of said gear blank and defining an internal peripheral surface of said gear blank; forming recesses in said internal peripheral surface of said gear blank; inserting said shaft blank through said bore, so that said shaft blank projects beyond said opposite sides of said gear blank; heating said shaft blank in regions thereof adjacent to and between said opposite sides of said gear blank until said shaft blank becomes relatively plastic in said regions of said shaft blank; and compressing said shaft blank axially to effect radial expansion of said relatively plastic regions and thereby cause said relatively plastic regions to fill said recesses of said gear blank and fuse therewith, whereby the radially expanded regions of said shaft blank are confined within said recesses of said gear blank.

9. The method of making a gear and shaft blank assembly in which said gear blank and said shaft blank are to be united in accordance with the method of claim 8 where said recesses in said internal peripheral surface of said gear blank are formed by beveling the junctures of said internal peripheral surface and said opposite sides of said gear blank.

10. The method of making a gear blank and shaft blank assembly in which said gear blank and said shaft blank are to be united in accordance with the method of claim 8 where said recesses in said internal peripheral surface of said gear blank are formed by grooving the junctures of said internal peripheral surface and said opposite sides of said gear blank.

11. The method of making a gear and shaft blank assembly in which said gear blank and said shaft blank are to be united in accordance with the method of claim 8 where said recesses in said internal peripheral surface of said gear blank are formed by notching the junctures of said internal peripheral surface and said opposite sides of said gear blank, said notched recesses having a substantially right-angled cross sectional configuration.

12. The method of making a gear and shaft blank assembly in which said gear blank and said shaft blank are to be united in accordance with the method of claim 8 where said recesses in said internal peripheral surface of said gear blank are located adjacent to but spaced from said opposite sides of said gear blank.

13. The method of making a gear and shaft blank assembly where said gear blank and said shaft blank are to be united and comprising the steps of: forming a bore in said gear blank, said bore passing axially through opposite sides of said gear blank and defining an internal peripheral surface of said gear blank; forming recesses in said internal peripheral surface of said gear blank adjacent said opposite sides of said gear blank; forming a groove in said bore; inserting said shaft blank through said bore, so that said shaft blank projects beyond said opposite sides of said gear blank; heating said shaft blank in regions thereof adjacent said opposite sides of said gear blank until said shaft blank becomes relatively plastic in said regions of said shaft blank; and compressing said shaft blank axially to effect radial expansion of said relatively plastic regions and thereby cause said relatively plastic regions to fill said recesses of said gear blank and fuse therewith, whereby the radially expanded regions of said shaft blank are confined within said recesses of said gear blank.

14. The method of making a gear and shaft blank assembly where said gear blank and said shaft blank are to be united comprising the steps of: cutting a gear blank from bar stock; forming a bore in said gear blank, said bore passing axially through opposite sides of said gear blank and defining an internal peripheral surface of said gear blank; forming recesses in said internal peripheral surface of said gear; cutting a shaft blank from bar stock; inserting said shaft blank through said bore of said gear blank, so that said shaft blank projects beyond opposite sides of said gear blank; heating said shaft blank in the regions adjacent to and between said opposite sides of said gear blank until said regions become relatively plastic; and compressing said shaft blank axially to effect radial expansion of said relatively plastic regions of said shaft blank and thereby cause said relatively plastic regions to fill said recesses of said gear blank and fuse therewith, whereby the radially expanded regions of said shaft blank are confined within said recesses of said gear blank.

15. A method of making a gear and shaft blank assembly where said gear blank and said shaft blank are to be united and comprising the steps of: forming a bore in said gear blank, said bore passing axially through opposite sides of said gear blank and defining an internal peripheral surface of said gear blank; forming recesses in said internal peripheral surface of said gear blank; inserting said shaft blank through said bore, so that said shaft blank projects beyond opposite sides of said gear blank; placing electrical conductors around said shaft blank, in contact therewith and spaced from said opposite sides of said gear blank; passing an electrical current through said conductors to thereby heat said shaft blank in the regions adjacent to and between said opposite sides of said gear blank until said regions become relatively plastic; and compressing said shaft blank axially to effect radial expansion of said relatively plastic regions and thereby cause said relatively plastic regions to fill said recesses of said gear blank and fuse therewith, whereby the radially expanded regions of said shaft blank are confined within said recesses of said gear blank.

16. The method of making a gear and shaft blank assembly in which said gear blank and said shaft blank are to be united in accordance with the method of claim 15 where said recesses in said internal peripheral surface of said gear blank are formed by beveling the junctures of said internal peripheral surface and said opposite sides of said gear blank.

17. The method of making a gear and shaft blank assembly in which said gear blank and said shaft blank are to be united in accordance with the method of claim 15 where said recesses in said internal peripheral surface of said gear blank are formed by grooving the junctures of said internal peripheral surface and said opposite sides of said gear blank.

18. The method of making a gear and shaft blank assembly in which said gear blank and said shaft blank are to be united in accordance with the method of claim 15 where said recesses in said internal peripheral surface of said gear blank are formed by notching the junctures of said internal peripheral surface and said opposite sides of said gear blank, said notched recesses having a substantially right-angled cross sectional configuration.

19. A method of making a gear and shaft blank assembly where said gear blank and said shaft blank are to be united and comprising the steps of: forming a bore in said gear blank, said bore passing axially through opposite sides of said gear blank and defining an internal peripheral surface of said gear blank; forming recesses in said internal peripheral surface of said gear blank adjacent said opposite sides of said gear blank; forming a groove in said bore; inserting said shaft blank through said bore, so that said shaft blank projects beyond opposite sides of said gear blank; placing electrical conductors around said shaft blank, in contact therewith and spaced from said opposite sides of said gear blank; passing an electrical current through said conductors to thereby heat said shaft blank in the regions adjacent to and between said opposite sides of said gear blank until said regions become relatively plastic; and compressing said shaft blank axially to effect radial expansion of said relatively plastic regions and thereby cause said relatively plastic regions to fill said recesses of said gear blank and fuse therewith, whereby the radially expanded regions of said shaft blank are confined within said recesses of said gear blank.

20. The method of making a gear and shaft blank assembly in which said gear blank and said shaft blank are to be united in accordance with the method of claim 15 where said recesses in said internal peripheral surface of said gear blank are located adjacent to but spaced from said opposite sides of said gear blank.

References Cited in the file of this patent

UNITED STATES PATENTS

| | | |
|---|---|---|
| 418,198 | Lemp et al. | Dec. 31, 1889 |
| 1,294,679 | Lackman | Feb. 10, 1919 |
| 1,322,848 | Von Henke | Nov. 25, 1919 |
| 1,361,214 | Wild | Dec. 7, 1920 |
| 1,881,934 | Powis | Oct. 11, 1932 |
| 2,221,415 | Short | Nov. 12, 1940 |

FOREIGN PATENTS

| | | |
|---|---|---|
| 150,373 | Austria | Aug. 10, 1937 |